United States Patent [19]

Lundeen

[11] Patent Number: 5,266,147
[45] Date of Patent: * Nov. 30, 1993

[54] METHOD AND APPARATUS FOR UNLOADING GREEN TIRES AND POSITIONING CARCASSES ON A TIRE BUILDING DRUM

[75] Inventor: Michael A. Lundeen, Findlay, Ohio

[73] Assignee: Cooper Tire & Rubber Company, Findlay, Ohio

[*] Notice: The portion of the term of this patent subsequent to Jul. 30, 2008 has been disclaimed.

[21] Appl. No.: 908,798

[22] Filed: Jul. 6, 1992

Related U.S. Application Data

[63] Continuation of Ser. No. 629,297, Dec. 18, 1990, abandoned.

[51] Int. Cl.⁵ .............................................. B29D 30/26
[52] U.S. Cl. ................................ 156/406.2; 156/396; 414/737; 414/752
[58] Field of Search .......................... 156/406.2, 396; 414/225, 737, 752, 750

[56] References Cited

U.S. PATENT DOCUMENTS

| | | | |
|---|---|---|---|
| 4,584,049 | 4/1986 | Mukae et al. | 156/396 |
| 4,634,489 | 1/1987 | Dupommier | 156/406.2 X |
| 5,035,567 | 7/1991 | Davis | 156/406.2 X |

Primary Examiner—Michael W. Ball
Assistant Examiner—Francis J. Lorin
Attorney, Agent, or Firm—Joseph G. Nauman

[57] ABSTRACT

A system for manufacturing tires includes a flangeless green tire assembly drum mounted to a head stock by a cantilevered shaft and coaxially aligned with a belt-tread stock building drum. A transfer mechanism is positioned intermediate the two drums and transfers a built belt-tread stock assembly from the drum to the green tire assembly drum. An unloading mechanism for the built green tires includes two extensible arms mounted to the head stock and flanking the green tire drum, having gripping members at the ends of the arms which are movable towards and away from the green tires, to pick up the completed green tires and move them from the green tire assembly drum. A carcass loading apparatus is incorporated into the unloading apparatus and is fixedly mounted longitudinally to, but rotatable relative to, the extensible arm. The carcass loading apparatus includes a rotatable arm mounted to the extensible arm having a cradle at the end thereof for carrying the carcass. The gripping members pick up a green tire from the green tire assembly drum and move it longitudinally away, to a position where it unloads the green tire. The arm carrying the cradle is movable along with the extensible arm to a longitudinal position beyond the green tire assembly drum. The arm and carcass are rotatable into coaxial alignment with the green tire assembly drum and the extensible arms are retractable to position the new carcass over the green tire assembly drum.

17 Claims, 3 Drawing Sheets

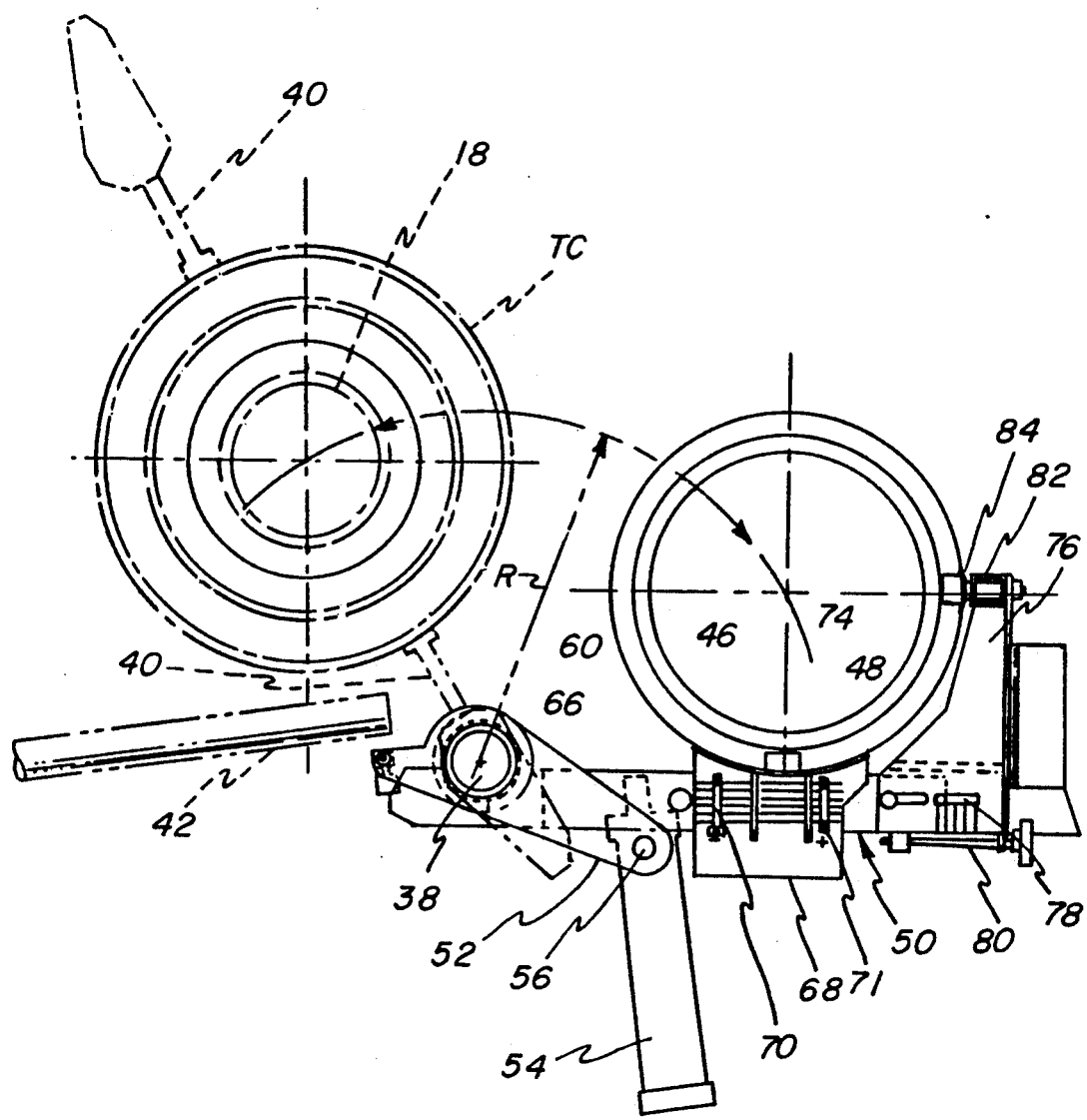

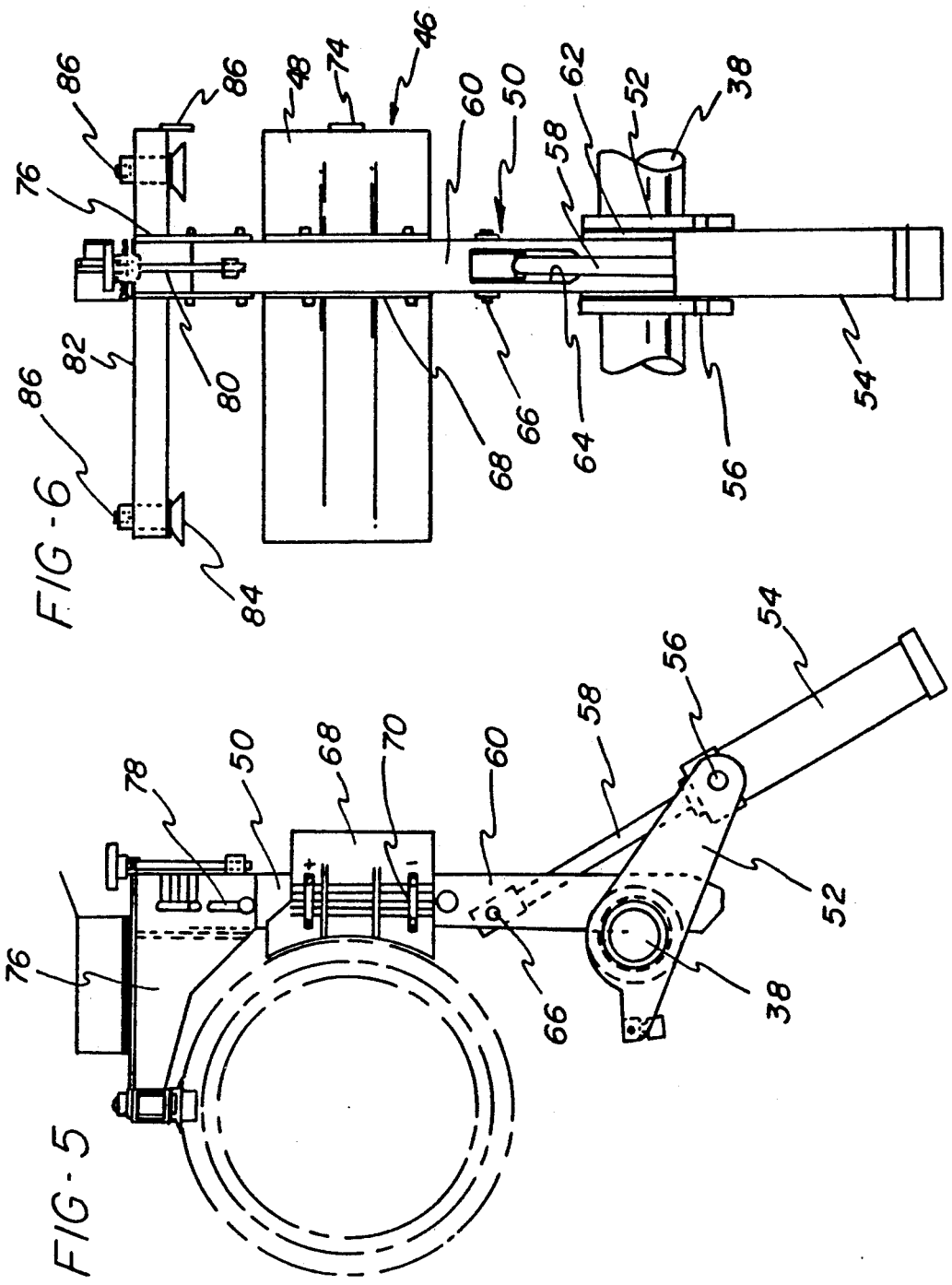

METHOD AND APPARATUS FOR UNLOADING GREEN TIRES AND POSITIONING CARCASSES ON A TIRE BUILDING DRUM

CROSS-REFERENCE TO PARENT APPLICATION

This application is a continuation of application Ser. No. 629,297 filed Dec. 18, 1990, now abandoned.

BACKGROUND OF THE INVENTION

This invention relates to a method and apparatus for unloading green tires from, and positioning new carcasses on, a green tire assembly drum, and more particularly to a carcass loading apparatus which is incorporated into an unloader for assembled green tires.

The basic elements of modern radial-ply pneumatic tires include an inner liner, one or more radial plies, side walls, beads and fillers, etc., all combined to form a carcass, and one or more belts made of steel cord or other cord materials combined with tread stock material to form a belt-tread stock assembly. These two assemblies are then combined to form a green tire, which is subsequently vulcanized in a mold to form a completed radial tire.

The first stage assembly, referred to herein as the "green tire carcass" consists of an inner liner plus one or more body plies of rubber-coated cord material, a pair of axially spaced parallel bead assemblies, layers of the ply material which encompass the bead assemblies, and side wall stock material, all of which when combined, comprise a first stage assembly. These tire elements are assembled and consolidated on a cylindrical carcass building drum such that the one or more body plies (in the case of a radial tire) have the body ply cords essentially parallel to the rotational axis of the building drum as the carcass is assembled thereon, for example, extending along the cylindrical carcass.

The two beads are anchored to the opposing axial extremities of the first stage carcass, for example, by folding part of the plies inward around the respective beads, the beads being parallel one to the other and co-axial with the rotational axis of the carcass, and the two layers of side wall stock are circumferentially consolidated to the outer surface of the carcass, axially disposed one from the other and each adjacent to one of the beads. The completed carcass is later transformed from the cylindrical shape to that of a toroid so the radial body cords, being essentially parallel to the rotational axis, are made to assume the configuration of meridians to the rotational axis of the carcass.

The second assembly is prepared by consolidating one or more relatively non-extensible belts, of suitable cord, (for example, steel wire in the case of a steel-belted tire) incorporated into uncured rubber stock, with a band of tread stock. Then the belt-tread stock assembly is consolidated with a toroidal shaped carcass, producing a finished green radial tire which is removed from the building machine and placed in a suitable mold for final shaping and vulcanization of the various rubber components, thereby forming a completed cured tire.

U.S. Pat. No. 4,445,963 shows a conventional apparatus for building a green tire, where the assembly includes a support track having a green tire building section mounted at one end and a belt and tread stock building section at an opposite end of the track. The green tire building section includes a green tire assembly drum mounted to a cantilevered shaft which extends from a suitable head stock. The belt and tread stock building section includes a rotatably mounted drum which is extensible and contractible for building different sizes of second assemblies. A transfer mechanism is also typically included intermediate the green tire building section and the belt and tread stock building section, the transfer mechanism being movable to place a completed belt-tread stock assembly over a completed carcass, which is located on the green tire building drum.

In a typical green tire assembly process, the operator must first remove a completed green tire from the green tire building drum and carry it to a storage rack or place it onto a take-away conveyor. He must then step over to a carcass storage rack and pick up a carcass that was completed elsewhere, carry it to the green tire building drum, lift it and place it thereupon. Thus, carcass loading is an interdependent function which must follow green tire unloading immediately to assure maximum utilization of the costly tire assembly equipment. The green tire building drum will then transform the cylindrically shaped carcass into a toroid which is then ready to receive the belt/tread assembly which was built on the belt tread stock building drum and which is being delivered to the toroidal-shaped carcass by the transfer mechanism. A suitable stitcher mechanism is then engaged to consolidate the two component assemblies into a completed green tire which is then released by the drum so that it can be removed.

SUMMARY OF THE INVENTION

The object of the invention is to provide for a carcass loading apparatus which loads completed carcasses automatically onto the green tire assembly drum and which apparatus can be supplied with a carcass any time (when empty) the operator has time available so that the carcass loading function will not disrupt whatever else he might be doing.

A further object of the invention is to provide for such carcass loading in combination with a green tire unloading apparatus which arrangement reduces loading time thus making the tire assembly equipment more productive.

Additionally, since the operator no longer has to lift the often heavy carcasses onto the building drum, this novel apparatus reduces operator fatigue which is a noticeable factor in production slow down after several hours of operation.

Other objects and advantages of the invention will be apparent from the following description, the accompanying drawings and the appended claims.

The above-mentioned objects of the invention are accomplished by providing a mechanism for unloading an assembled green tire from, and loading a built carcass onto, a green tire assembly drum. The mechanism comprises a pair of extensible shafts flanking the drum, and being extensible in a longitudinal direction from a position proximate to the drum, to a position longitudinally beyond and remote from the drum. Gripping means are located proximate to the ends of the shaft and are actuable to grip a completed green tire and move it to the remote position. Loading means are pivotally mounted relative to the longitudinal direction and are longitudinally movable synchronously with the extension and retraction of the extensible shafts. The loading means comprises carcass holding means attached to an end of a pivotal arm, the arm being pivotal from a first position radially remote from the axial centerline of the drum to a second position co-axially aligned with the drum. In this manner, when a carcass is attached to the carcass holding means with the loading means in the first position, and a green tire gripped by the gripping means is moved longitudinally away from the drum by extension of the extensible shafts and unloaded, the carcass can be pivoted into coaxial alignment with the drum and retraction of the extensible shafts positions the carcass over the drum.

BRIEF DESCRIPTION OF THE DRAWINGS

FIG. 4 is a detailed end view of the carcass loading and unloading apparatus;

FIG. 5 is a view similar to that of FIG. 4, showing the apparatus in the loading position; and FIG. 6 is a front view of the carcass loading apparatus.

DETAILED DESCRIPTION OF THE PREFERRED EMBODIMENT

The invention relates to an apparatus for loading carcasses onto a green tire building system in cooperation with an apparatus which unloads completed green tires from the green tire building system. The invention is useful in systems such as disclosed in U.S. Pat. No. 4,445,963.

GENERAL LAYOUT

Figure 1:
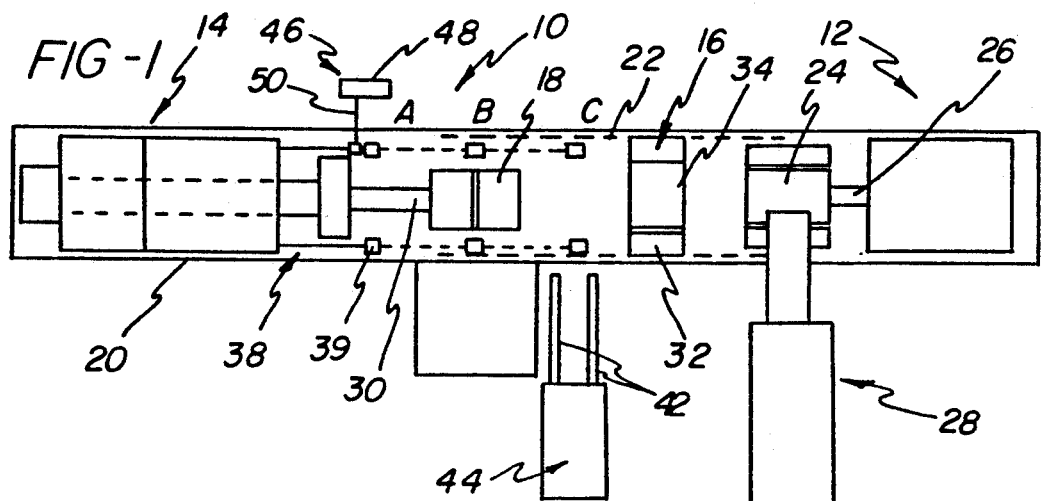
FIG. 1 is a diagrammatical plan view of the tire assembly apparatus including the subject invention.

FIG. 1 is a floor plan of the second stage of a two-stage tire building system, which includes a belt and tread stock building section, shown generally at 12, and a green tire assembly section, shown generally at 14, and intermediate the sections 12 and 14, a transfer mechanism 16 which removes a completed belt and tread stock assembly from the belt and tread building drum, stores same and delivers same to and places it coaxially over a carcass on the green tire assembly drum 18 of the assembly 14.

The belt-tread stock assembly section 12 and the green tire assembly section 14 are preferably supported on a common bed 20 having a track, such as a machined gib or way 22. At one end of the track 22, there is a belt-tread stock building drum 24 (sometimes called a belt building drum), supported on a rotatable shaft 26, with its axis of rotation extending parallel to track 22. Adjacent the belt building drum, there is a belt server 28 which can supply one or more belt components to the belt building drum 24, and a tread stock server (not shown) which can supply a length of tread stock to the belt building drum; a suitable tread stock server is disclosed in U.S. Pat. No. 4,820,373.

At the other end of track 22, there is a flangeless tire assembly drum 18, comprising two drum halves rotatably supported on a second shaft 30 with its axis parallel to track 22 and precisely in line with the axis of belt building drum 24. The transfer mechanism 16 includes a carriage 32 supported for movement along the second track 22 between the drums 18 and 24 and includes a transfer ring 34 which can engage and remove a completed belt-tread stock assembly from the belt building drum 24 and move such assembly over and around a carcass which has been placed on the tire building drum 18, which has been manipulated into a toroidal shape.

The details of construction of a suitable transfer ring 34 are disclosed in U.S. Pat. No. 4,402,782. The ring preferably is located for movement between the drums with the center of the ring 34 coaxial with the axes of rotation of both drums 18 and 24. Within the ring, there is a plurality of retaining shoes (not shown) which can be projected inward to contact the outer surface of the belt-tread stock assembly.

After the transfer ring has been moved into its pick-up position around the belt-tread stock building drum 24, the transfer shoes extend inward until contact with the belt/tread package is made, and drum 24 is then collapsed sufficiently to transfer support of the assembly to ring 34. Carriage 32 is then driven into its second position around the green tire assembly drum 18, on which a carcass has already been placed. The partially inflated carcass is then inflated further until its outside diameter comes into contact with the inside diameter of the belt/tread assembly, after which transfer ring 32 releases the belt/tread package and moves to its inactive or parked position (as in FIG. 1), and a stitching mechanism stitches the belt-tread stock assembly to the now shaped carcass, as shown in U.S. Pat. Nos. 4,402,782 and 4,306,931, resulting in a completed green tire still supported on drum 18.

Figure 2:
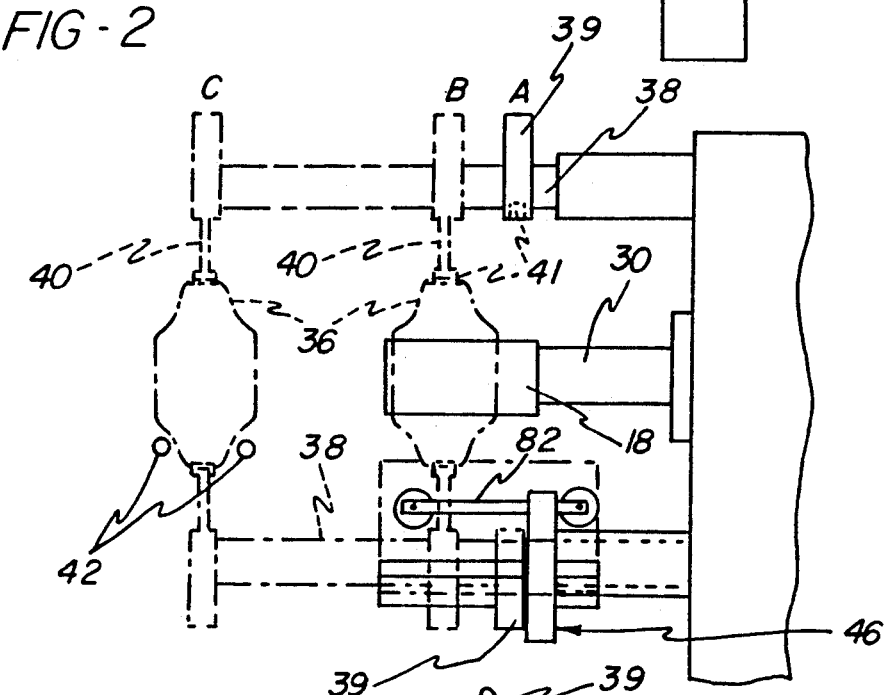
FIG. 2 is a front view of the carcass loading and unloading apparatus.

As shown in FIGS. 1 and 2, after the belt-tread stock package is combined with the carcass, extensible arms 38 move from position A, where arms 38 are fully retracted, to position B where gripping assemblies 39 are longitudinally aligned with the tire building drum 18 and with the completed green tire 36. The gripping assemblies 39 include radially movable gripping arms 40 having gripping pads 41 at ends of the arms 40. With the gripping assemblies 39 aligned with the green tire 36, the gripping arms 40 are activated to engage the green tire 36, building drum 18 is then collapsed, and the extensible arms 38 are thereafter extended to position C where the green tire 36 is longitudinally aligned with the discharge rails 42 of the discharge assembly 44. The gripping arms 40 are then deactivated and the green tire rolls onto the now extended discharge rails 42 of the assembly 44. The discharge assembly is shown in greater detail in assignee's U.S. patent application Ser. Nos. 529,073 and 529,080, filed on May 25, 1990, now U.S. Pat. No. 5,035,567 issued Jul. 30, 1991, incorporated herein by reference.

As explained more fully hereafter, one of the extensible arms 38 includes a carcass loading assembly 46 comprising a cradle 48 mounted on an arm 50. The arm 50 is pivotally mounted about the extensible arm 38, but longitudinally fixed and movable therewith. Thus, when the extensible arms 38 are in position A, as shown in FIG. 1, the loading assembly 46 is pivoted out and away from the green tire building drum 18. At this position, an operator loads the cradle 48 with a carcass for placement on the drum. The extensible arms are then moved longitudinally to position B with transfer ring 34 having moved to its parked position, the green tire is gripped and the extensible arms move to position C to discharge the assembled green tire.

When the gripping assembly is in position C, as shown in FIG. 1, the loading assembly 46 is longitudinally beyond the tire building drum 18. After the completed green tire is discharged, the carcass loading assembly 46 pivots the carcass into coaxial alignment with assembly drum 18, and as the extensible arms 38 are retracted, the new carcass is slidably received over drum 18. The carriage 48 is thereafter pivoted away from the drum 18 and the arms and carriage 48 retract to position A, as shown in FIG. 1, in position for receipt of another new carcass.

CARCASS LOADING APPARATUS

Figure 3:
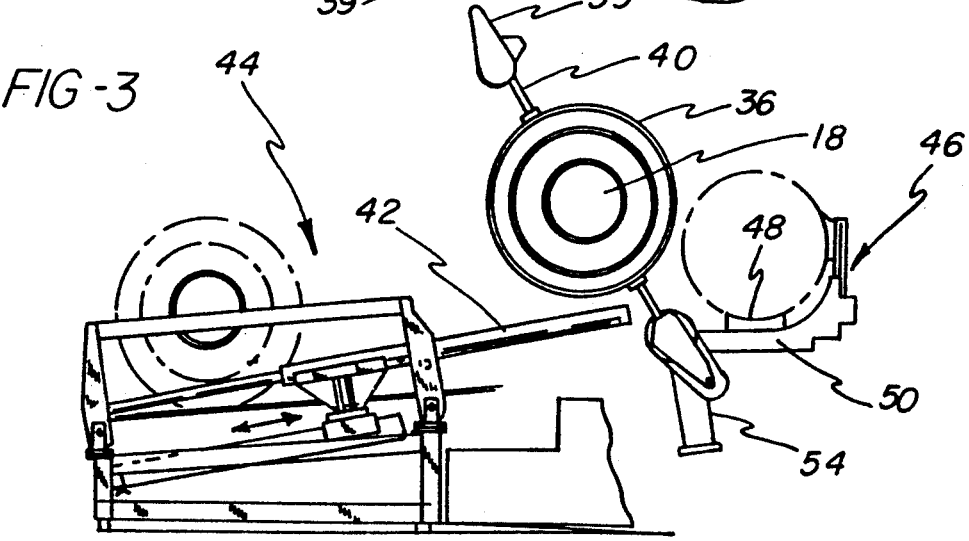
FIG. 3 is an end view of the carcass loading and unloading apparatus.

With reference now to FIGS. 2 through 6, the loading assembly 46 will be described in greater detail. With reference first to FIG. 3, the loading assembly 46 is shown interconnected to the lowermost extensible arm 38, where the cradle 48 is positioned on the arm 50 and faces upwardly in the carcass loading position.

As shown in FIGS. 4 and 6, the loading assembly 46 includes two brackets 52 fixedly mounted to arm 38 which flank a hydraulic cylinder 54 pivotally supported at 56 between brackets 52. In the preferred embodiment of the invention, brackets 52 are fixed to arm 38 by dowel pins (not shown), although other attachment means are also possible, for example by keying. As shown in FIG. 6, the pivoting arm 50 comprises a box-like section 60 fixed to a bearing 62 which rotates about the extensible arm 38. Thus, actuation of the arms 38 causes the longitudinal movement of the loading assembly 46, as the bearing 62 is trapped between the two brackets 52.

As shown in FIG. 6, the rod 58 of cylinder 54 extends through an opening 64 of the box-like arm 60 and is pinned thereto at 66. Thus, as hydraulic cylinder 54 is pivotally fixed at 56, actuation of the hydraulic cylinder 54 causing extension of the rod 58, results in pivotal movement of the arm 50 from the position shown in FIG. 4, to the position shown in FIG. 5. It should be noted from FIG. 4, that the cradle 48 and the pivotal arm 50 are positioned along a radius of curvature R, which passes through the axial centerline of the drum 18.

As shown in FIG. 4, the cradle portion 48 comprises two brackets 68 fixed to the outside of the box-like arm 60 through slotted openings 70, thereby allowing cradle 48 to be movable upwardly and downwardly to adjust the assembly for various carcass diameters. The cradle further includes at one end thereof, a guide tab 74 (FIGS. 5 and 6) for end positioning of a carcass relative to the extensible arm 38. The pivoting arm 50 further comprises end brackets 76 fixed to the outer box-like arm 60 via slotted holes 78, thereby allowing the brackets 76 to be movable toward and away from the extensible arm 38 for adjustment for various carcass diameters. A jackscrew assembly 80 is also provided at the lower end of the bracket 76 to provide for assistance in the movement of the brackets 76. A crossbar 82 is fixed to an upper section of the brackets 76 and includes vacuum cups 84, at opposite ends thereof, interconnected to vacuum lines at 86, for retaining a carcass 90 to the carriage assembly 46 during the rotation of the carcass into a coaxial relation with the green tire building drum 18.

With the detailed description of the loader disclosed above, the operation of the mechanism will now be described by way of reference to FIGS. 1-6. With reference first to FIG. 1, the description of the sequence will begin where the gripping assemblies 39 are in position A as shown in FIGS. 1 and 2. It should be understood that when the gripping assemblies 39 are in position A, a carcass is positioned on drum 18, and that the carcass loading mechanism 46 is in the position shown in FIG. 4. A new carcass TC is placed on the cradle 48 against end stop 74 and the vacuum cups 84 are activated to retain the carcass in position on the cradle 48.

With a carcass positioned on the green tire assembly drum 18, the transfer mechanism 34 moves to the right, as viewed in FIG. 1, to pick up a completed belt-tread stock assembly from the drum 24. The transfer mechanism 34 is then moved to the left (as viewed in FIG. 1) and places the belt-tread stock assembly coaxially over the carcass which is presently positioned on drum 18, and the subassemblies of a green tire can be joined in the conventional manner.

Upon completion of the green tire, the extensible arms 38 are moved to position B as shown in FIGS. 1 and 2, to position the gripper assemblies 39 in alignment with the green tire 36, as shown in FIG. 2. The gripping assemblies 39 have extensible arms 40 which, when in position B, are extended to position gripping pads 41 against the green tire and tire building drum 18 is now deactivated. The extensible arms 38 are now moved to position C where the green tire is longitudinally aligned with the discharge rails 42 as shown in FIGS. 2 and 3. When in position C, the extensible arms 40 are retracted and the green tire is unloaded onto the momentarily extended rails 42 for further processing. It should be understood that, as the extensible arms 38 move to the positions B and C, the carcass loading apparatus 46 moves longitudinally with the extensible arms 38.

When the gripping assemblies 39 are moved to position C, as viewed in FIGS. 1 and 2, the cradle 48 and the retained carcass are longitudinally beyond the green tire building drum 18, although still in the pivoted position shown in FIG. 4. After gripping assemblies 39 have released the green tire, the carcass loading apparatus 46 is pivoted by actuation of the hydraulic cylinder 54 to a position where the arm 60 is in a vertical position, whereby the carcass being held by vacuum cups 84 is rotated into coaxial alignment with drum 18, as shown in FIG. 5.

The extensible arms 38 are thereafter moved back to position B thereby placing the carcass over drum 18, and the vacuum cups are deactivated to release the carcass from the carcass loading apparatus. The carcass loading apparatus 46 is then rotated back to the position shown in FIG. 4 and the extensible arms moved back to position A. Anytime thereafter, the operator may again place a built-up carcass on the tray 48 in abutment with the alignment tab 74 (FIG. 6) in anticipation of the next machine cycle.

While the method and apparatus herein described, and the form of apparatus for carrying this method into effect, constitute preferred embodiments of this invention, it is to be understood that the invention is not limited to this precise method and apparatus, and that changes may be made in either without departing from the scope of the invention, which is defined in the appended claims.

What is claimed is:

1. An apparatus for unloading an assembled green tire from, and loading a built carcass onto, a green tire assembly drum, the apparatus comprising:
    a pair of extensible arms flanking the drum, and being extensible in a longitudinal direction parallel to the drum;
    gripping means located on and proximate to the ends of said arms for movement from a position proximate to the drum, to a position longitudinally beyond and remote from the drum and being actuable to grip the green tire and move it to said remote position;

loading means pivotally mounted for swinging motion relative to said longitudinal direction of said arms attached to one of said extensible arms, so as to be longitudinally movable synchronously with the extension and retraction of said extensible arms, said loading means comprising a pivoting arm and carcass holding means attached to an end of said pivoting arm, said pivoting arm being pivotal from a first position where said carcass holding means is radially displaced from the drum to a second position where said carcass holding means is coaxially aligned with the drum, whereby when a carcass is attached to the carcass holding means in said first position, and the green tire is gripped by said gripping means and moved longitudinally away from the drum by extension of said extensible arms, the carcass can be pivoted into coaxial alignment with the drum, and retraction of said extensible arms positions the carcass over the drum.

2. The apparatus of claim 1, wherein said extensible arms are mounted to a head stock which supports the drum.

3. The apparatus of claim 1, wherein the loading means is pivotally mounted to one of said arms in a longitudinally fixed position for movement therewith.

4. The apparatus of claim 3, wherein said loading means comprises a support means fixedly mounted to said one extensible shaft, and further comprises moving means attached to said support means and to said pivoting arm for moving said carcass holding means from said radially displaced position to said coaxially aligned position.

5. The apparatus of claim 4, wherein said moving means is a hydraulic cylinder interconnected between said carcass holding means and said support means.

6. The apparatus of claim 5, wherein said support means comprises a pair of brackets fixed to said one extensible shaft, said pivoting arm being rotatably supported on said shaft intermediate said brackets, and said hydraulic cylinder is mounted between said brackets and said pivotal arm.

7. The apparatus of claim 1, wherein the carcass holding means comprises an arcuate cradle for supporting a carcass and vacuum means for holding said carcass within said cradle.

8. In a manufacturing system for tires, an apparatus for assembling a green tire from a second stage belt-tread stock package and a first stage carcass, comprising:

a support track having first and second ends;

a green tire assembly section mounted at said first end and comprising an assembly drum, a head stock having a cantilevered shaft extending from and supporting said drum, said drum and shaft extending along a generally horizontal axis towards the center of said support track;

a belt and tread stock building section at said second end of said support track and comprising a belt and tread stock building drum mounted rotatably on a shaft coaxial with, and facing, said green tire assembly drum;

transfer means intermediate said green tire assembly drum and said belt and tread stock building drum comprising means to transfer a finished belt and tread stock from said belt and tread stock building drum to said green tire building drum, said transfer means being coaxially mounted relative to said two drums and movable along said support track between said drums;

green tire unloading means mounted adjacent to said green tire assembly drum, said unloading means comprising extensible means movable along a line parallel with said support track, said extensible means supporting gripping means adapted to grip the green tire and move the green tire along a longitudinal axis beyond said green tire assembly drum; and carcass loading means supported by said extensible means and movable synchronously therewith, said carcass loading means comprising a carriage means movable from a position radially displaced from said longitudinal axis to a position coaxial with said longitudinal axis.

9. The apparatus of claim 8, wherein the carriage means pivots from said radially remote position to said coaxial position.

10. The apparatus of claim 8, wherein the green tire unloading means comprises extensible arm means extensible from the position adjacent to said green tire assembly drum to the position longitudinally beyond the green tire assembly drum.

11. The apparatus of claim 10, wherein said extensible arm means are mounted to said head stock parallel to said support track.

12. The apparatus of claim 10, wherein said carcass loading means comprises a support means fixedly mounted to said extensible arm means, and further comprises carriage moving means attached to said support means for moving said carriage from said radially remote position to said coaxially aligned position.

13. The apparatus of claim 12, wherein the carriage moving means is a hydraulic cylinder interconnected between said carriage means and said support means.

14. The apparatus of claim 13, wherein said carriage means comprises an arm pivotally mounted to said extensible arm means, and said hydraulic cylinder is mounted between said support means and said pivotally mounted arm to produce a swinging motion of said pivotally mounted arm about said extensible arm means.

15. An apparatus for unloading an assembled green tire from, and loading a built carcass onto, a green tire assembly drum, the apparatus comprising:

a pair of extensible shafts flanking the drum, and being extensible in a longitudinal direction from a position proximate to the drum, to a position longitudinally beyond and remote from the drum;

gripping means located proximate to the ends of said shafts being actuable to grip the green tire and move it to said remote position;

loading means being mounted to one of said extensible shafts in a longitudinally fixed position being extensible and retractable with said extensible shafts, said loading means comprising carriage means for holding a carcass to be loaded on the drum, said carriage means being movable from a first position radially remote from the drum to a second position coaxially aligned with the drum, whereby when a carcass is attached to the carcass holding means with the loading means in said first position, and the green tire is gripped by said gripping means and moved longitudinally away from the drum by extension of said extensible shafts and unloaded, the carcass can be moved into coaxial alignment with the drum, and retraction of maid extensible shafts positions the carcass over said drum.

16. The apparatus of claim 15, wherein the loading means is pivotally mounted to one of said shafts in a longitudinally fixed position.

17. The apparatus of claim 16, wherein the carriage means pivots from said radially remote position to said coaxial position.

* * * * *